United States Patent Office 2,783,249
Patented Feb. 26, 1957

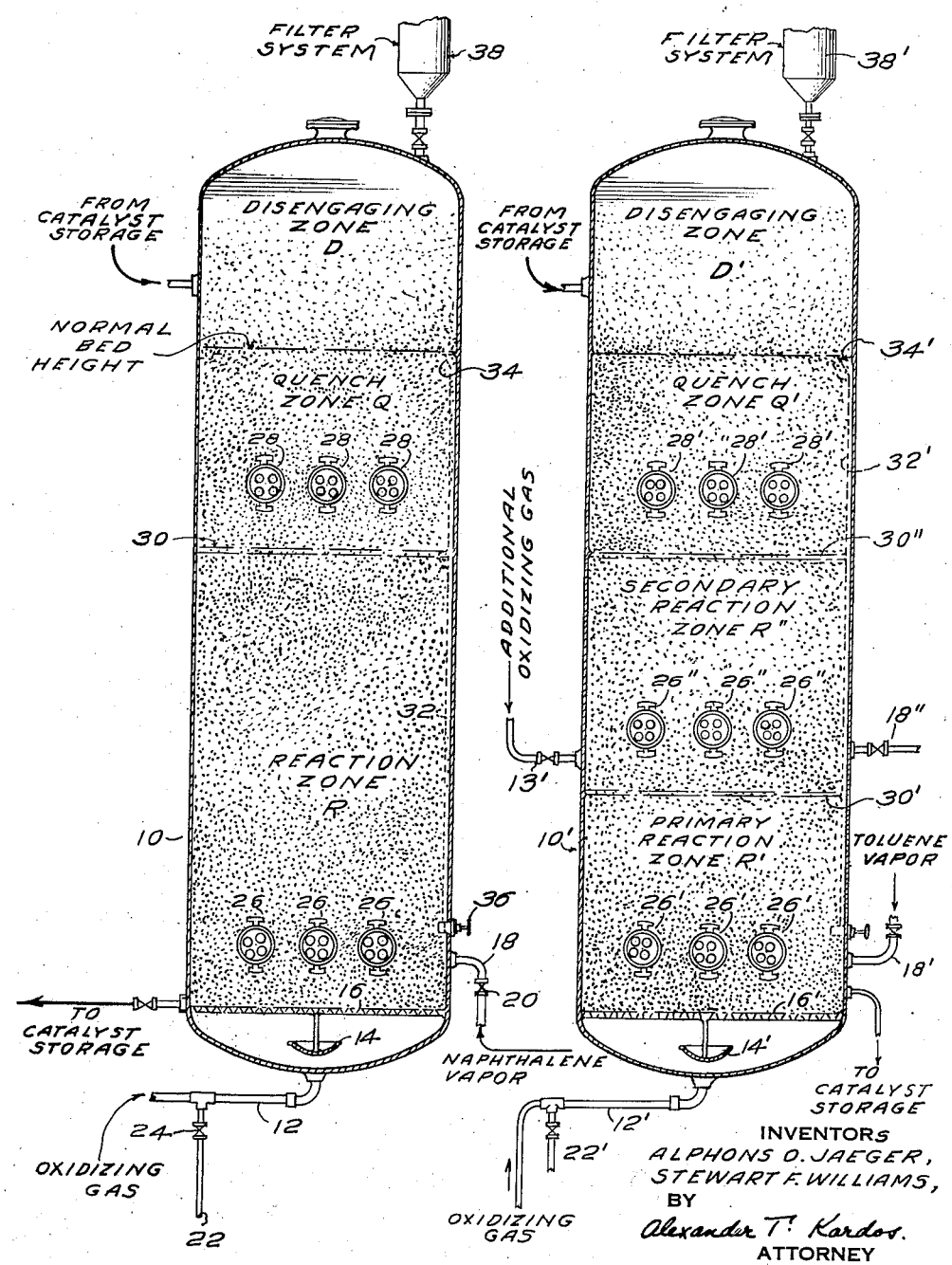

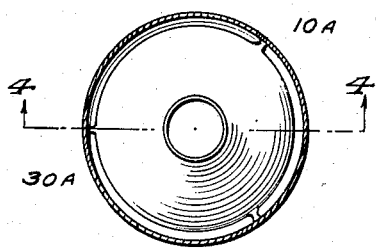
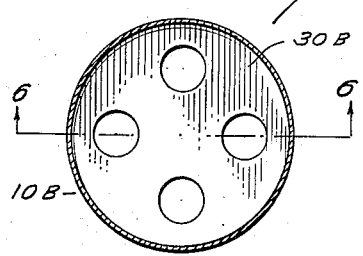
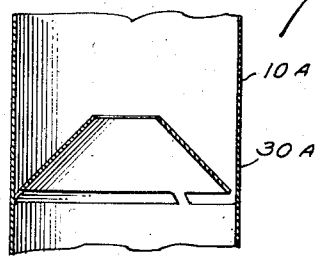
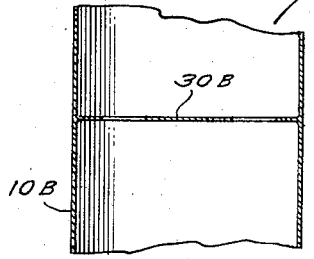
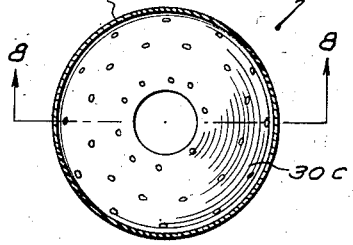
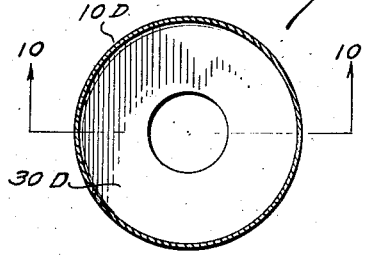
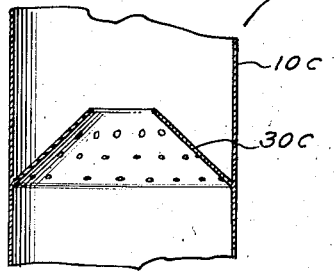
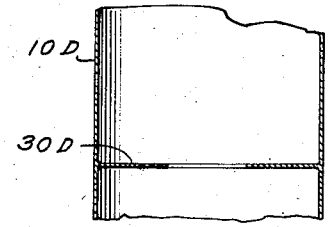
INVENTORS
ALPHONS O. JAEGER,
STEWART F. WILLIAMS,
BY
Alexander T. Kardos.
ATTORNEY

2,783,249

METHOD AND APPARATUS FOR OXIDIZING VOLATILIZABLE ORGANIC MATERIALS

Alphons O. Jaeger, Greenwich, and Stewart F. Williams, Wilton, Conn., assignors to American Cyanamid Company, New York, N. Y., a corporation of Maine Application April 16, 1953, Serial No. 349,294

1 Claim. (Cl. 260—346.4)

The present invention relates to improvements in fluid catalytic systems for the conversion of vaporous or vaporizable organic materials into desired intermediate conversion products, and more particularly to improved methods and apparatus for maintaining more efficient temperature controls over the reactants and the reaction products during and immediately following the catalytic conversion.

Within the broad concepts of the present invention, the basic principles thereof are generally applicable to oxidation reactions, which are exothermic in nature, or to any type of exothermic reaction wherein necessity arises for maintaining temperature controls within relatively close ranges during and immediately following the course of the reaction.

Within the more specific aspects of the present invention, the basic principles thereof find particularly advantageous application in highly exothermic processes wherein the possibility of uncontrollable reactions is greater and wherein the need for efficient temperature controls is normally more critical. One specific example of such a process is a system for catalyzing the vapor phase oxidation of organic compounds, and particularly hydrocarbons, involving the passage of streams containing the vaporizable organic compound and an oxidizing gas through a bed comprising a finely-divided, so-called fluid oxidation catalyst maintained in the form of a turbulent dense phase of fluidization.

One typical commercial application of such a vapor phase oxidation reaction is the oxidation of naphthalene to phthalic anhydride. Such an oxidation process is well known in the prior art, as noted in United States Patents 2,373,008 and 2,453,740. This reaction will be used in order to describe the present invention. However, it is to be pointed out that this particular reaction has been selected primarily for illustrative purposes and that such is not to be construed as limitative of the broader aspects of the present inventive concept.

Hitherto, the temperature has been maintained substantially uniform throughout these dense fluidized catalyst beds at the most favorable reaction temperature, whereby the oxidation of the organic materials was presumed to take place at the most desirable safe rate. Following this oxidation, the reaction mixture, with or without any unreacted materials, along with any entrained catalyst, was allowed to enter a dilute or catalyst-disengaging phase for the separating of the reaction mixture from the catalyst particles. The exothermic reaction, however, did not cease promptly with the entrance of these materials into the dilute or catalyst-disengaging phase and, consequently, in the absence of any effective temperature controls, the evolution of heat continued for a time in that phase, without control thereover. One immediate result of such an extended reaction was that the desired intermediate oxidation products were further oxidized and decomposed to undesirable and useless end products, notably carbon dioxide and water, whereby the product yields were reduced.

In addition to this uncontrolled prolongation of the reaction and decomposition of the desired oxidation products, any heat liberated in the dilute catalyst phase, due to the exothermic nature of the reaction, could not be satisfactorily dissipated by radiation or other natural physical means and consequently the temperatures within the reactors frequently rose uncontrollably to high levels. In many cases, it was determined that the temperatures rose to an estimated 750–1000° C., thus simulating so-called "fire and explosion conditions" necessitating reducing or completely shutting off the feed of the organic materials to the reaction chamber. These high temperatures were extremely harmful to the catalytic materials, to the reactors and to the filters, causing considerable damage in many respects thereto, as well as endangering the safety of the operation, or perhaps rendering it completely inoperative. In addition, such high temperatures, in the specific case of the conversion of naphthalene to phthalic anhydride, could cause decarboxylation of the phthalic anhydride to benzoic acid or bring about the formation of tarry residues which would interfere with the proper operation of the filters and catalyst.

Considerable time and effort have been applied to the solution of this problem and the popularly accepted approach has been to install heat-exchanging apparatus in the dilute or catalyst-disengaging phase so that efforts could be made to lower the temperature therein and to try to bring the reaction under control.

Such an approach, however, has not proven to be too successful for various reasons. In the first place, the heat transfer in the dispersed or disengaging phase is very poor due to the relative diluteness of the heat-transferring catalyst particles and to the low gas and catalyst velocity therein. Efforts have been made to improve the settling-out of the catalyst by increasing the cross-sectional area of the dispersed phase whereby a larger volume was provided. However, such efforts merely served to aggravate the situation, inasmuch as the gas velocity and catalyst flow were reduced which merely served to even further decrease the heat-transfer coefficient.

Additionally, it has been observed that the relatively fine particles of catalytic material tend to coat and partially insulate the heat-exchanging surfaces, thereby even further reducing the effectiveness of the heat transfer. In the particular case of highly exothermic reactions, these difficulties were even more acute and, consequently, there still remains considerable room for improvement in this field, especially when highly exothermic reactions are involved.

It is the principal object of the present invention to provide improved methods and apparatus for maintaining more efficient temperature controls over the reactants and reaction products during such a catalytic conversion, whereby the possibility of uncontrolled reactions, explosions, and fires is eliminated and the decomposition of the desired intermediate conversion products is avoided, thereby making the operation safe as well as providing substantially increased product yields.

We have found that when a heat-exchanging system is installed in the dilute catalyst phase, it is not sufficiently efficient or effective to take care of the high exotherm evolved in the oxidation of organic compounds to intermediates and consequently these latter compounds, when not under close temperature control, are subject to further oxidation to undesirable end products, such as carbon dioxide and water.

We have further established that in order to secure sufficient heat exchange effectiveness as is required in highly exothermic reactions at reasonable commercial loadings, the products of reactions and any unreacted materials must be completely cooled prior to their emergence from the dense catalyst phase. This control over the cooling of the materials can be established in a dense phase on account of the high turbulence and high heat transfer characteristics thereof as compared to the relatively poor heat transfer and stream line flow in the dilute phase.

In this way, the materials, when they are at the higher temperatures of conversion or oxidation, are always within the dense catalytic phase wherein an adequate heat interchanging system is present for the desired dissipation of the heat evolved. Then, while still in this dense catalytic zone, the reaction materials are cooled and, by the time they have entered the dilute or catalyst-disengaging phase wherein a heat interchanging system would be inadequate for the dissipation of the heat involved, the temperatures will have been lowered sufficiently so that practically no further exothermic reaction or oxidation takes place therein.

In accordance with the present inventive concept, this may be accomplished by dividing the dense catalytic phase into several catalytic temperature zones by the use of baffles and controlling the temperature in each zone selectively and individually by heat exchanging devices. Although the desired number of zones depends on the particular type of reaction concerned, the following description will be based on two zones, but it is to be appreciated that the use of a greater number of zones is possible.

When two zones are desired, such may be obtained by using a baffle to provide prior and posterior portions in the reaction zone and installing suitable heat exchangers or temperature control means in each portion to maintain the desired temperature ranges therein. In the prior portion, the temperature range selected will be that which has been found most favorable for the particular oxidation reaction involved, the catalyst used and the particular feed rate of reactants desired. In the posterior portion, the temperature range will be that required to substantially put an end to the conversion process so as to avoid the possibility of fires, explosions and uncontrollable reactions in the dilute phase and thus prevent the possibility of catalyst and equipment damage as well as the decomposition of the desired conversion products.

These prior and posterior portions are in contacting relationship and thus the dense catalytic phase extends as one continuous bed without any intervening dilute phase between the different temperature zones. This is of considerable importance inasmuch as such an intervening dilute phase would interrupt the continuity of the reaction which would be deleterious, particularly with regard to these types of oxidation reactions and especially insofar as high product yields are concerned.

In the event that it is desired that the dense catalyst bed exist in three temperature zones, such may be provided by using an additional baffle and installing a third suitable heat exchanger or temperature control means in an intermediate portion between the prior and posterior portions whereby three temperature ranges would be possible in the one continuous catalyst bed. Such a system would find excellent application to those processes which are more favorably carried out in a plurality of stages. An example of such a process would be the oxidation of toluene to maleic anyhdride through the intermediate oxidation products of benzaldehyde and benzoic acid.

In a similar way, four or more temperature zones may be provided within the catalyst bed by simply employing additional heat exchanging systems and baffles and locating them where required or desired.

In the accompanying drawing and following specification, we have illustrated and described preferred designs of apparatus for carrying out the methods of our inventive concept, but it is to be understood that our invention is not to be considered as limited to the particular constructions disclosed except as determined by the scope of the appended claim.

With reference to the accompanying drawing:

Figure 1 is a graphical representation schematically setting forth in vertical cross-section one form of reactor suitable for practicing the present invention;

Figure 2 is a graphical representation of a modified form of reactor also suitable for practicing the present invention;

Figure 3 is a cross-sectional plan view showing a modified form of baffle;

Figure 4 is a cross-sectional elevational view taken on the line 4—4 of Figure 3;

Figure 5 is a cross-sectional plan view showing another modified form of baffle;

Figure 6 is a cross-sectional elevational view taken on the line 6—6 of Figure 5;

Figure 7 is a cross-sectional plan view showing still another modified form of baffle;

Figure 8 is a cross-sectional elevational view taken on the line 8—8 of Figure 7;

Figure 9 is a cross-sectional plan view showing a further modified form of baffle; and Figure 10 is a cross-sectional elevational view taken on the line 10—10 of Figure 9.

Referring to Figure 1, the numeral 10 represents a vertical converter or reactor which is substantially cylindrical in shape and which, in its simplest form, basically comprises three zones; a reaction zone R; a quench zone Q; and a catalyst disengaging zone D. The reaction zone R and the quench zone Q are designed for the disposition of a mass of finely divided or powdered catalytic material, generally called fluid catalyst, which is maintained in a turbulent state in the dense phase zone by the reactant gases and vapors which are passed upwardly therethrough during the reaction.

An inlet supply pipe 12 is provided for the introduction of an oxidizing gas, such as air, into the lower part of the reaction zone R. A diffuser 14 and a distribution grid 16 which may comprise a perforated plate or similar means are employed to provide a more uniform flow of the reaction gas through the catalytic material in the reaction zone R.

The volatilized or volatilizable materials, either in liquid or gaseous form, may be introduced into the reaction zone R through any desired inlet means 18, having thereon a feed rate control device, such as an adjustment valve 20. Any suitable form of inlet means arrangement may be employed but it has been found that a header, or bustle pipe, provided with several evenly spaced injection nipples entering the reaction zone R, preferably above the grid 16, is quite satisfactory. Although the particular embodiment of the invention selected for illustrative purposes discloses separate inlets for the vaporizable materials and the reaction gas, it is to be appreciated that all gasiform reactants may enter through a common inlet where such an arrangement is preferable.

For example, a separate inlet 22 equipped with an individual control device, such as a valve 24, may be provided for the admission of the vaporizable organic materials whereby the oxidizing gas passing through the inlet 12 is mixed with the organic materials and the mixture enters the reactor 10 together.

An air compressing system (not shown) may be used to control the pressure and rate of flow of the oxidizing gas. In a similar way, an air heater (not shown) may also be added to preheat the entering gases to any desired temperature range. Similar compressing means and/or heating means may be utilized to control the pressure, rate of flow and temperature of the organic materials, if they are individually fed to the reactor.

In operation, the rate of flow of the gas stream must be such as to maintain the finely divided catalyst in the reactor in fluidized condition, in which the constantly moving mass of particles presents to the eye the appearance of a vigorously boiling liquid. The minimum pressure of the entering gas stream must, of course, be sufficient to overcome the hydrostatic head exerted by the fluid catalyst bed, whereas the maximum pressure is dependent upon the particular conditions desired for the specific process involved.

A plurality of temperature control elements, such as heat exchangers 26, are positioned within the reaction zone R to bring the same within any desired or necessary conversion temperature range. For the purposes of this invention, the term "conversion temperature" or "oxidation temperature" is defined as that temperature range which has been most favorable for the conversion or oxidation of the particular vaporizable organic material. In the specific case of the conversion of naphthalene to phthalic anhydride, it has been found that this range extends from about 320° C. to about 425° C., with the most favorable temperature being in the neighborhood of approximately 350° C., depending upon the particular type of catalyst being employed for the reaction, which naturally affects the temperature and time of contact of the process.

These heat exchangers 26 are preferably in the form of removable U-tubes which lie in a horizontal plane and effectively maintain the zone at the most favorable operating temperatures. The cooling medium employed may be any desired heat exchanging substance such as water, a salt bath, mercury, "Dowtherm" (a mixture of diphenyl oxide and diphenyl), or the like. It is apparent, of course, that the temperature of the U-tubes and consequently the temperature of the reaction zone may be regulated by adjusting the temperature and the rate of flow of the particular cooling medium within the heat exchange tubes. If necessary or desired, as in the case of boiling liquids, pressure may be applied to the cooling media in the system in order to obtain the desired temperatures therein.

A second plurality of temperature control elements 28, also in the form of a series of removable U-tube heat exchangers, extends in a horizontal plane transversely within the quench zone of the reactor and these heat exchange elements are controlled separately from the first series of heat interchangers 22. These U-tubes effectively control the temperatures existing in the quench zone and their high effectiveness is due to the characteristics of the fluid dense phase of the catalytic material therein.

A baffle 30 is positioned in the catalyst bed between the heat exchangers 26 and 28 and assists in the establishing of two temperature ranges in the bed. The baffle 30 may possess various configurations, as is shown in Figures 3-10 to be described hereinafter, and in Figure 1 it is illustrated in the form of a perforated plate, somewhat similar in shape to distribution grid 16. This baffle 30 also provides for a uniform flow of the gas stream upwardly through the quench zone, whereby channeling, bubbling and other undesirable effects are prevented.

In the specific case of the conversion of naphthalene to phthalic anhydride, it has been found that the preferable temperature range in the quench zone extends from about 200° C. to about 300° C., with the most favorable temperature being in the neighborhood of approximately 250° C.

The nature and effectiveness of the individually controlled heat exchangers 26 and 28 and the baffle 30 is such that the catalyst and the reaction mixture entering the quench zone very rapidly attains the temperature desired in that zone whereby the oxidation reaction is immediately stopped and conditions are quickly established for safe operation therein as well as in the dilute disengaging phase and in the filtering means.

Under no circumstances, however, should the control over the heat exchangers 28 be such that the quench zone temperature is permitted to approach or equal the temperature of the reaction zone but, at substantially all times, it must be necessarily lower. Were this otherwise, fires, explosions and uncontrollable reactions would start in the dilute disengaging zone, inasmuch as the materials entering therein would still be well within the oxidation temperature range and the continuing exothermic reaction would liberate considerable amounts of heat which could not be effectively absorbed or transferred in such a dilute or disperse catalytic phase.

As the conversion products and gases pass upwardly through the dense catalytic phases represented by the reaction zone and the quench zone, they mechanically carry with them considerable amounts of entrained catalyst particles, particularly fines. In order to maintain a continuous dense phase from the bottom of the reactor to the top of the catalyst bed, a vertically-positioned downcomer circulating or return pipe 32 is provided adjacent the internal surface of the cylindrical reactor. The downcomer pipe is so positioned in the quench zone that the upper lip 34 thereof is submerged in the bed at all times to facilitate proper control over the bed level. Although merely one circulating or return pipe 32 is shown internally of the reactor 10, it is, of course, realized that several return pipes 32 may be employed and that they need not necessarily be internally located but may be externally positioned as well.

Preferably the rate of catalyst return to the lower portion of the bed is controlled by means of a valve or valves 36 which may be actuated by pressure, level or density control in the quench zone, the action of which is automatically operable.

As the reaction products and accompanying materials enter the quench zone, the temperature thereof is very quickly decreased so that when they emerge therefrom and enter the catalyst disengaging space, they are at the lower temperature, as determined by the heat interchangers 28.

As a result, when these materials are in the catalyst disengaging space D wherein the bulk of the entrained catalyst is separated from the reaction mixture, they are at all times therein at a temperature below the normal conversion temperature of the reaction and consequently there is essentially no oxidation and negligible or no evolution of heat. This is a very important and necessary condition inasmuch as the effectiveness of any heat exchange system would be very low therein due to the inherently poor heat transfer characteristics of a dilute catalyst phase.

This disengaging space is provided in order to permit entrained catalyst to drop out of the gas stream and return to the quench zone catalyst bed. In this space, however, there is a "dispersed phase" of catalyst, inasmuch as a considerable portion of the catalyst fines which are being removed from the gas stream have a tendency to remain in suspension in the gases in this zone, but naturally at a much lower concentration than in the dense catalyst phase. This concentration is such, moreover, that any heat interchange effected by the catalyst particles is of a very low value whereby any heat exchange elements, even if placed therein, would be ineffective and inefficient for the reasons previously explained, such as the dusting or coating of the heat exchange elements with fine catalyst, low gas velocity which results in poor heat transfer, etc.

The reaction products then pass upwardly and out through a filter system which is preferably positioned on top of the reactor and close to the catalyst disengaging space. The filter system may comprise a number of large flanged-head drums 38, one of which is shown, or a cyclone separator, or the equivalent. These filtering elements hold back any catalyst fines or other particles entrained in the effluent gases, not separated out in the disengaging zone, and permit the filtered gases to pass therethrough.

The principles of the present invention are not limited to a two-temperature catalyst bed, but are similarly applicable to a multi-temperature catalyst bed wherein several different temperature ranges are possible. For example, as shown in Figure 2, a three-temperature catalyst bed may be employed.

A cylindrical reactor 10' is provided and comprises four zones: a primary reaction zone R'; a secondary reaction zone R''; a quench zone Q'; and a catalyst disengaging zone D'. An oxidizing gas-inlet supply pipe 12', a diffuser 14' and a distribution grid 16', similar to corresponding elements of Figure 1, are also provided. If desired or required, an inlet 13' may be employed to supply additional oxidizing gas. The volatilizable materials may be introduced separately through lower inlet 18' or upper inlet 18'', or may be previously intermixed with the oxidizing gas by means of an inlet 22' entering the gas inlet 12', whereby all gasiform reactants enter the reactor at the same time.

Temperature-control elements in the form of individually controlled U-tube heat exchangers 26', 26'' and 28', and baffles 30' and 30'', are employed to establish three different temperature zones in the catalyst bed. A return pipe or pipes 32' having an upper lip 34' is used, as previously described, to maintain control over the height of the catalyst bed, whereby a continuous dense-phase catalyst bed extends from the lower part of the reactor to the upper part of the quench zone Q'. It will be understood that the lower end of the return pipe 32' may terminate either in the primary or the secondary reaction zone or, when a plurality of pipes are used, their ends may terminate in either or both zones.

Such a three-temperature catalyst bed lends itself quite readily to processes which are more advantageously carried out in two stages. For example, in the production of maleic anhydride from an aromatic hydrocarbon such as toluene, the primary reaction zone may be maintained at the proper temperature essentially to oxidize the side chain initially to form benzaldehyde and benzoic acid, which in turn may be converted to maleic acid anhydride through an oxidative rupture of the ring in the secondary reaction zone. Such a two-stage process results in higher yields of the maleic anhydride than could be obtained by a one-stage direct oxidation of the aromatic hydrocarbon.

In a similar way, four or more temperature zones can be established in the catalyst bed merely by the use of a plurality of individual heat exchangers and baffles, whereby three or more stages of oxidation or conversion could be provided.

The invention is not to be considered as limited to the particular type of heat exchanger used, nor to the specific form of baffle employed. For example, in Figures 3 and 4, a reactor 10A is illustrated within which is mounted by suitable supporting means a modified form of baffle 30A possessing a truncated conical configuration.

In Figures 5 and 6, the reactor 10B possesses a plate-like baffle 30B which extends substantially transversely of the reactor and which possesses a plurality of openings for the passage of the gas stream and catalyst.

In Figures 7 and 8, the reactor 10C has a truncated conically-shaped baffle 30C which possesses merely a centrally-located circular opening for the passage of the gas stream and catalyst.

In Figures 9 and 10, the reactor 10D has a plate-like baffle 30D which has merely one centrally located circular opening for the gas stream and catalyst.

The principles of the present invention are equally applicable to substantially any size of convertor and therefore there is no restriction as to the productive capacity of a single unit. Consequently, very large convertors may employ the principles of this invention.

As explained above, such large units with high production capacity and flexibility of operation used for highly exothermic catalytic oxidation reactions are possible because of the great safety which is established due to the cooling or quenching operation which takes place in the dense catalyst phase.

The flexibility of the operation is such as to provide velocities of 0.2 foot per second or less up to velocities of 5.0 feet per second or more. A velocity of 0.5–2.0 feet per second for a naphthalene-air mixture has been found satisfactory for this type of operation.

In the catalytic oxidation of organic compounds, particularly the conversion of naphthalene to phthalic anhydride, a 0.5 to 2.0 mol percent (and preferably 1.25 to 1.50 mol percent) naphthalene to air feed ratio has been found to give excellent yields, and high quality product. Higher and lower ratios can be used and are somewhat dependent on the catalyst used.

The flow of the reactant materials is upwardly in the reactor, as illustrated in the drawings. In the specific case of the oxidation of naphthalene to phthalic anhydride, the reaction air leaves the compressor unit at approximately 22 pounds per square inch gauge and drops off approximately 1.0 to 1.5 pounds per square inch on passage through the perforated distribution grid 16, prior to entering the reaction zone. The naphthalene, coming from the vaporization unit at about 25 pounds per square inch gauge, may be mixed with the air at the desired ratio. The flow of the stream is then upwardly through the reaction zone and quench zone, as previously described. It is to be realized that the naphthalene may also be introduced in liquid form or as a sublimate within the concepts of the present invention.

If it should be desired that the gas velocity be decreased or increased at any particular stage of the operation, such as in the reaction zone, or the quench zone, or the disengaging zone, such may be provided for by the use of narrower or wider cross sectional areas at the particular zone. For example, should it be desired that the reactant materials remain for a longer time in the reaction zone and for a shorter time in the quench zone, that part of the reactor below the baffle 30 may be increased in diameter and that part of the reactor between the baffle 30 and the disengaging zone D may be decreased in diameter, as required. The same effect may, of course, be obtained by the use of longer or shorter zones having the same diameter, whereby the gas velocities are not affected.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example 1*

The following is a description of the preparation of the catalyst and procedure for converting anthracene into anthraquinone. Two separate solutions are prepared as follows: (1) 18.5 lbs. of V₂O₅ were dissolved in 40 lbs. of 10 normal KOH solution and diluted with 200 lbs. of water; and (2) 5.6 lbs. of manganous sulfate $$(MnSO_4.2H_2O)$$

and 22.65 lbs. of ferric sulfate $(Fe_2(SO_4)_3)$ were dissolved in 300 lbs. of water and heated to about 90° C.

A 5–7% slurry containing approximately 200 lbs. of freshly prepared silica gel, made from potassium silicate and sulfuric acid, was prepared. The silica gel was washed reasonably free of salts. Solution 1 was then added to the silica gel slurry and thoroughly mixed. Then solution 2 was added to this slurry which was kept in constant agitation.

The slurry was then spray-dried to produce a product having the following particle-size range:

By screening method:
    Percent thru 40 mesh 98 to 100
    Percent thru 100 mesh 90 to 98
    Percent thru 200 mesh 55 to 90

By sedimentation method:
    Percent minus 40 microns 10 to 20
    Percent minus 20 microns 2 to 10
    Percent minus 10 microns 0 to 8

The average particle size was in the range of from about 30 to about 100 microns and preferably in the range of 45 to 75 microns. The catalyst was calcined in air at 380° C. before use.

The procedure for the conversion of anthracene to anthraquinone was as follows: air was fed into the bottom of the reactor at such a rate that the average velocity of air in the reactor, assuming no catalyst, was from about 0.2 to about 5 feet per second, and preferably from about 1.0 to 2.0 feet per second. The anthracene, either in vapor form or in liquid form, was fed into the bed of catalyst through the inlet pipe or header at such a rate that the ratio of anthracene to air was about 1 to 2.5 mol percent, and preferably from about 1.25 to 1.50 mol percent. The temperature of the reaction zone was maintained at about 340 to 450° C. and preferably in the range from about 360 to about 380° C. The height of the bed was such that the contact time was about 1 to about 30 seconds and preferably from about 5 to about 15 seconds. The temperature, contact time and mol percent anthracene were all somewhat interdependent and dependent upon the activity of the particular catalyst being used.

The quench zone was maintained at a temperature above which anthraquinone will not condense on the catalyst or on the equipment, and below which there is no reaction. With a normally active catalyst, this temperature is in the neighborhood of about 300° C. The catalyst is separated from the reaction gases in the disengaging space and in the filters and the anthraquinone is recovered in suitable condensers. A yield of about 95 to 100 lbs. of anthraquinone per 100 lbs. of 100% anthracene were obtained.

*Example 2*

The preparation of the catalyst and the procedure for converting toluene into maleic anhydride was as follows: An aluminum sulfate solution was prepared by mixing 6500 lbs. of sulfuric acid and sufficient water to make a 50% solution of sulfuric acid, and then adding approximately 3300 lbs. of bauxite ore concentrate (B. O. C.; aluminum trihydrate of commerce) and heating for approximately one hour at a temperature of about 230° F. After the heating had been completed water was added to bring the concentration to approximately 8% $Al_2O_3$. The vanadium, molybdenum and silver solution was prepared as follows: 96.5 lbs. of ammonium metavanadate were dissolved in 300 gal. of water which was heated to near boiling. 36.8 lbs. of ammonium molybdate was then dissolved in this solution. When the ammonium molybdate was dissolved, the solution was cooled to about 15 to about 25° C. and 320 gal. of nitric acid (CP) was added, keeping the temperature below 30° C. Then 14.7 lbs. of silver nitrate was added to this solution.

A silica gel slurry was prepared in accordance with the procedure set forth in U. S. Patent 2,478,519, issued August 9, 1949. Then 55 gal. of the aluminum sulfate solution and all of the vanadium, molybdenum and silver solution were slowly added simultaneously to the silica gel slurry. When both solutions were all in, the bath was allowed to agitate for a short while and 15% ammonium hydroxide solution was added beneath the surface of the slurry to a pH of 4.6. The final slurry contained approximately 5% silica gel and usually had a temperature of 100° F. After a brief agitation, the slurry was delivered to a filter feed tank and then filtered and washed in a two stage filtration as described in U. S. Patent 2,478,519.

The slurried filter cake was fed continuously to a rotating kiln in which the catalyst gel was dried at a temperature below 800° F. The dried catalyst gel was then cooled, ground and classified to yield a product which has the following particle size range:

By screening method:

Percent thru 40 mesh 95 to 100
    Percent thru 100 mesh 90 to 98
    Percent thru 200 mesh 50 to 90

The conversion of the toluene to maleic anhydride was as follows: air was fed into the bottom of the converter at such a rate that the average velocity of air in the reactor, assuming no catalyst, was about 0.2 to 5.0 feet per second, and preferably about 1.0 to 2.0 feet per second. The toluene vapor was fed into the catalyst bed in the primary reaction zone at such a rate that the ratio of toluene to air was about 1 to 2.5 and preferably 1.25 to 1.50 mol percent. The temperature of the primary reaction zone was maintained at about 360 to 380° C. The height of the catalyst bed was such that the contact time was about 1–5 seconds and preferably 3 seconds.

The reaction mixture then passed into the secondary reaction zone which was maintained at a temperature of about 340 to 360° C. The bed height was maintained so that the contact time was about 3 to 5 seconds and preferably 4 seconds.

The reaction mixture then passed into the quench zone which was maintained at a temperature of about 200 to 300° C. and preferably 250° C.

The temperatures, contact times and mole percent toluene to air were all somewhat interdependent. In the primary reaction zone, the toluene was converted substantially into benzaldehyde and benzoic acid which, in turn, were substantially converted into maleic anhydride in the secondary reaction zone. The quench zone very quickly cooled the reaction mixture to a temperature at which there was no further oxidation and no condensation in the converter or on the catalyst. The catalyst was separated from the reaction gases in the disengaging zone and in the filters, and the maleic anhydride was recovered in suitable condensers. A yield of 70–80 lbs. of maleic anhydride per 100 lbs. of 100% toluene was obtained.

*Example 3*

The following is a description of the preparation of the catalyst and procedure for converting naphthalene into phthalic anhydride.

| Materials: | Pounds |
| --- | --- |
| Demineralized water | 1240 |
| Ammonium metavanadate | 35.7 |
| Potassium silicate (comm. solution) | 585 |
| $H_2SO_4$, 17% | 572 |
| Ammonia solution (15%) | 184 |
| Silver nitrate (22% solution) | 25.8 |

Heat 1160 lb. water in a precipitation tank to 60° C. with live steam. The steam will increase the weight close enough to the specified 1240 lbs.

Add the potassium silicate to the water in the precipitating tank and bring temperature to 45° C., then add the sulfuric acid over a period of 12–15 min., add the ammonium metavanadate and agitate the solution until it is dissolved, then add the ammonia solution over a period of about 15 min. (under the surface of the liquid), add the silver nitrate solution, and then hold 25 min. at 45° C.

Heat with live steam to 45° C. and hold for one hour. Pump the slurry to a direct-fired kiln at a steady rate over a 4-hour period. The inlet gas temperature of the kiln should preferably not be over 1250° F. and the catalyst should leave the kiln at approximately 600–750° F. This produces a catalyst having a surface area of about 30–60 m.$^2$/gm., or preferably in the range 35–45 m.$^2$/gm.

SPECIFICATIONS

| Constituent: | [1] Ignited basis |
|---|---|
| V₂O₅ | 9.0–10.2%. |
| SiO₂ | 41–47%. |
| K₂O/SO₃ | [1] 1.85–2.10. |
| Particle size | Through 80 mesh, 98% min; –20 microns, 12% max. |

[1] Heating 2 hours at 350° C.

The procedure for the conversion of naphthalene to phthalic anhydride was as follows: air was fed into the bottom of the reactor at such a rate that the average velocity of air in the reactor, assuming no catalyst, was about 0.2 to 5 feet per second and preferably 1.0 to 2.0 feet per second. The naphthalene vapor was fed into the catalyst bed in the reaction zone at such a rate that the ratio of naphthalene to air was about 1.0 to 2.0 mol percent and preferably 1.25 to 1.75 mol percent. The temperature of the reaction zone of the catalyst bed was maintained by the heat exchangers at about 320 to 410° C., and preferably about 350° C., depending upon the bed height. The height of the entire catalyst bed comprising a reaction zone and a quench zone was such that the contact time was about 3–25 seconds and preferably 7 to 15 seconds. The temperature, contact time and mol percent naphthalene to air were all somewhat interdependent factors and dependent upon the activity of the particular catalyst being used.

The reaction mixture was maintained by the heat exchangers in the quench zone of the catalyst bed at a temperature of about 210 to 270° C. and preferably 250° C. The quench zone very quickly cooled the reaction mixture to a temperature at which there was no further reaction and no condensation in the converter or on the catalyst. The catalyst was separated from the reaction gases in the disengaging zone and in the filters and the phthalic anhydride was recovered in suitable condensers. A yield of 90–105 lbs. of phthalic anhydride per 100 lbs. of 98% naphthalene was obtained.

In order to demonstrate the effectiveness of the quench zone, several runs were conducted with the quench zone temperature maintained at a temperature approximately equal to the reaction zone temperature of between 320 to 410° C. Thus the reaction mixture was not cooled therein and entered the dilute catalyst phase in the disengaging zone at temperatures of from about 320 to 410° C. Under these conditions oxidation of the reaction mixture continued in the dilute phase, causing an uncontrollable temperature rise estimated to be over 750° C.

The net result of this high temperature was the nearly complete loss of the desired product, phthalic anhydride, as well as injury and damage to the equipment, particularly the filters. Any catalyst present in the dilute phase was also damaged.

This is to be contrasted with laboratory operations which employed a reaction chamber having a 2 inch diameter. Such a reactor was operated continuously over an extended period of time with no runaway temperatures or uncontrollable reactions. However, upon increase of the diameter of the reactor to 12 inches or to several feet, as would be employed in a full-scale commercial operation, the danger of the uncontrollable reaction immediately appeared leading to the runaway temperatures which, in some cases, rose to approximately 1000° C.

While we have shown and described what we believe to be a preferred embodiment of our invention in the matter of simplicity and durability of construction, ease of operation, etc., it will be obvious that the details of such embodiment may be more or less modified within the scope of the claim, without departure from the principles of construction or material sacrifice of the advantages of the preferred design. Variations and modifications, therefore, may be made within the scope of this invention and portions of the improvements may be used without others.

We claim:

In a method of oxidizing vaporizable naphthalene hydrocarbons to phthalic anhydride which involves a highly exothermic reaction and which includes passing a stream containing naphthalene vapor and air in ratios of from 1 to 2 mol percent of naphthalene to air at an oxidizing temperature through a dense phase of a solid oxidation catalyst containing vanadium pentoxide maintained in a turbulent state of fluidization and then passing said stream through a dilute catalyst-disengaging phase, the improvement which comprises cooling the prior portion of said dense phase to a temperature of from about 320° C. to about 425° C. to control the oxidation of the naphthalene hydrocarbon to phthalic anhydride therein where adequate heat-exchange facilities for the exothermic reaction are present; and cooling the posterior portion of said dense phase to a temperature of from about 200° C. to about 300° C. to cool the stream passing therethrough to put an end to the oxidation reaction so that when said stream enters the dilute phase wherein adequate heat-exchange facilities for the exothermic reaction are not present it will be at a temperature lower than oxidation temperatures and insufficient to cause any uncontrollable reactions or any substantial decomposition of the phthalic anhydride.

References Cited in the file of this patent

UNITED STATES PATENTS

| 2,401,739 | Johnson | June 11, 1946 |
| 2,467,802 | Barr | Apr. 19, 1949 |
| 2,506,221 | Keith | May 2, 1950 |
| 2,526,689 | Rollman | Oct. 24, 1950 |
| 2,559,631 | Kalbach | July 10, 1951 |
| 2,600,444 | Sullivan | June 17, 1952 |
| 2,697,653 | Nicholson | Dec. 21, 1954 |